United States Patent [19]

Placek

[11] Patent Number: 5,162,137

[45] Date of Patent: Nov. 10, 1992

[54] METHOD FOR BONDING STYRENIC SURFACES

[75] Inventor: Douglas G. Placek, Fairless Hills, Pa.

[73] Assignee: FMC Corporation, Philadelphia, Pa.

[21] Appl. No.: 763,685

[22] Filed: Sep. 23, 1991

[51] Int. Cl.$^5$ ............................................. B05D 3/00
[52] U.S. Cl. ................................... 427/299; 156/215; 156/308.6; 156/326; 428/34.4; 528/491; 528/494; 528/497
[58] Field of Search ............. 156/215, 308.6, 326; 427/299; 428/34.4; 528/491, 494, 497

[56] References Cited

U.S. PATENT DOCUMENTS

| | | | |
|---|---|---|---|
| 1,950,954 | 3/1934 | Walsh et al. | 154/40 |
| 2,743,202 | 4/1956 | Amici | 148/6.14 |
| 3,468,467 | 9/1969 | Amberg | 229/1.5 |
| 3,681,166 | 8/1972 | Caiola et al. | 156/308 |
| 3,791,916 | 2/1974 | Eastes | 161/247 |
| 4,224,097 | 9/1980 | Talsma et al. | 156/326 X |
| 4,574,020 | 3/1986 | Fosnaught | 156/264 |
| 4,654,105 | 3/1987 | Fesman | 156/308 |
| 4,661,188 | 4/1987 | Fumei | 156/244.11 |
| 4,671,836 | 6/1987 | Fumei | 156/215 |
| 4,735,668 | 4/1988 | Hoffmann et al. | 156/215 |
| 5,039,370 | 8/1991 | Cesaroni | 156/326 |

OTHER PUBLICATIONS

Schwartz et al., *Plastic Materials and Processes*, Van Nostrand Reinhold Co., 1982, (N.Y.), pp. 786–787.

*Primary Examiner*—Michael Lusignan
*Attorney, Agent, or Firm*—R. E. Elden; F. Ianno; R. L. Andersen

[57] ABSTRACT

A method is provided for applying a polystyrene label to a surface of a polystyrenic article. The process comprises applying a thin film of a terpenoid compound to the polystyrene, the terpenoid compound having a boiling point between 150° C. and 260° C.

14 Claims, No Drawings

METHOD FOR BONDING STYRENIC SURFACES

The present invention relates to a method and a composition for bonding polystyrene labels to containers.

Polystyrene labels are widely used on food and beverage containers, particularly glass containers. The coated containers are substantially lighter than all glass containers because the walls of the containers can be thinner than conventional. As much as a third less glass than conventional is employed.

The coated glass containers have numerous advantages over the all glass containers with paper labels. They are shatter-resistant, light-weight, and have the ability to run on standard bottling and handling equipment. Additionally, the plastic surface can be directly printed on, thereby eliminating the application of a preprinted label. The coated containers can be packed in corrugated containers without partitions and will resist breakage as well as standard glass containers packed with partitions. The light weight of the bottles also reduces shipping and handling costs. A still further advantage is that the coating, while permitting the bottles to run on conventional processing lines, reduces noise on the equipment. In addition, less breakage occurs during the filling operation which reduces overall cost and improves safety.

One type of plastic which is currently used for a label is foamed polystyrene which can be heat-shrunk onto a container. Such a label is frequently laminated or coated to reduce materials costs, to modify physical properties or to improve the container's appearance on the shelf.

Mechanical handling equipment that applies the labels often employs a plastic label sheet feed supply and a drum which moves the label into engagement with the outer surface of a container. The label is wrapped around the container by rolling it along a fixed surface. The label is glued to the container. The overlapped ends are also glued together by the glue applicator assembly.

Hot melt adhesives have been used to secure the labels to the container and to form a glued side seam when applied to the overlapped label ends. The use of the hot melt adhesive has been messy and expensive. Heat is required to melt the adhesive. There is a hazard of overheating or possible burning from heaters used to melt the glue. In addition, the label cannot be easily removed from the container and hence the body portion of the container is contaminated and cannot be readily relabeled.

Instead, U.S. Pat. No. 4,661,188 teaches applying a solvent to the polymer to form a viscous tacky solution of the polymer in the solvent sufficient to tack and bond the label to container during wrapping. After the label is wrapped around the container, the bond between the container and label becomes weaker as the solidifying solution hardens so that the label can be easily and cleanly stripped from the container either for relabeling or for recycling. Obviously, it is important that the solvent does not discolor or adversely affect the appearance of the label. Consequently, the solvents which are employed are very volatile to ensure that they do not penetrate the label sufficiently to affect its appearance.

Currently, polystyrene labels are applied to bottles with methylene chloride or methyl ethyl ketone as the solvents. These low boiling solvents tackify the label, allowing it to adhere both to the bottle and to itself. The use of these solvents represent serious health or fire risks to bottle plant personnel. In addition, the methylene chloride solvent evaporates after application, either on the bottling line or in the oven that heat shrinks the labels. The evaporated solvents cannot be exhausted to the atmosphere as they would result in an unacceptable volatile organic carbon (VOC) emission. If some of the evaporated solvent finds its way into the glass furnace it forms hydrochloric acid, which is corrosive to the furnace, and also must be scrubbed from the exhaust. MEK presents a fire hazard with its low flash point of 24° F. (−4° C.) and is considered toxic. All other chlorinated or low boiling solvents that might be employed in this application present health or fire hazards that are undesirable.

U.S. Pat. No. 4,735,668 discloses that while the temporary bond between the label and glass created by a solvent, such as methylene chloride, is superior to one formed with hot glue, it is desirable to have a hot glue adhesive bond for the side seam or leading edge of the label. The patent teaches a separate machine is required to apply the two types of adhesive. However, the patent does not eliminate the problems of either adhesive system. Instead, it requires new machinery and retains the disadvantages of both the solvent adhesive and hot glue adhesive systems.

The present invention overcomes the problems of the prior art process by providing a method for forming a tacky surface area on a styrenic resin comprising applying to the area a thin film of a compound having a flash point greater than about 35° C. and a boiling point between about 150° C. and about 260° C. selected from the group consisting of methyl ethers of monocyclic aromatic compounds, a terpenoid, the terpenoid being a terpene or a derivative of a terpene, the terpene having a formula of $C_{10}H_{16}$.

For the purpose of this invention a styrenic resin comprises a polymer or copolymer comprising at least about 50% by weight polystyrene, and may include a foamed or unfoamed polystyrene manufacture; it may be a laminated or coextruded multilayered manufacture, such as a label or a coating.

Terpenoids are well-known compounds consisting of two or more isoprene units. That is, hydrocarbons with a formula of $(C_5H_8)n$ in which n=2 or more and their derivatives such as alcohols, ethers and aldehydes. Such terpenoid compounds may be monocyclic, dicyclic or acyclic compounds. Suitable terpenoids are those in which n=2, and include, but are not limited to: dipentene, l-limonene, d-limonene, citral, pinene, phellandrene, ocimene and citronellal. The terms dipentene or limonene include d-limonene, l-limonene or mixtures of the two. Suitable methyl ethers of monocyclic aromatic compounds include, but are not limited to eugenol, anisol and anethol.

It is particularly surprising that high boiling solvents, such as the preferred terpenoid solvents, could be employed in the process because when used alone high boiling solvents usually continue to solubilize and degrade the label for several hours after application. The labels become cracked and discolored, which is unacceptable. On the other hand the preferred terpenoid solvent, or a blend thereof unexpectedly does not degrade the label. The preferred terpenoid solvents have normal boiling points of about 150° C. or more and have flash points of at least about 37° C. Consequently, they avoid the flammability problem of the non-halogenated solvent, methyl ethyl ketone. Further, as they do not contain a halogen they are not corrosive if incinerated in a furnace. Finally, as they have boiling points of less than 260° C. they will evaporate on heat shrinking.

Having described the best mode of practicing the invention, the following examples are presented to illustrate the invention and are not intended to limit the scope thereof.

EXAMPLE 1

A group of potential "solvents" were screened by brushing them onto a polystyrene label. (The solvents were heated above their melting point if necessary to liquify them.) Those that created a tacky surface were further evaluated by heat shrinking the label to the bottle. The results are presented as Table I.

EXAMPLE 2

Hot Fill Test

Thin layers of solvents were brushed onto labels and were immediately applied to bottles. The bottles were then placed in an oven at 232° C. for 60 seconds to shrink fit the labels. If the labels did not peel away from the bottles initially the bottles were subjected to a hot fill test in which the labeled bottles were exposed to 88° C. water vapor for 3 minutes, immersed in 88° C. water for 10 minutes, and immersed in 27° C. water for 30 minutes. Compounds and results are presented as Table II.

TABLE I

| | HOT FILL TEST | | |
|---|---|---|---|
| Solvent | Flash Point °C. | Instant Tackifying | Hot Fill Test |
| d-limonene | 46 | Yes | Passes |
| anisole | 52 | Yes | Passes |

TABLE II

| EVALUATION OF SOLVENTS AS POLYSTYRENE ADHESIVES | | |
|---|---|---|
| Worked Well | Worked Slowly | Did Not Work |
| Anisole | Citral | Citronellol |
| Limonene (Dipentene) | Cinnamic Aldehyde | Patchone (Isopropyl Cyclohexanol) |
| Citronellal | Eugenol | Cibutyl Phthalate |
| Phellandrene | Phenoxy-2-propanone | Turpineol |
| Ocimene | 2-t-butyl phenol | Cyclohexane |
| Anethole | 2,6-isopropyl phenol | Di-n-octyl Phthalate |
| | Triphenyl Phosphate | Dimyrcene |
| | Trialkyl Phosphates | Cumylphenyl Acetate |
| | Triaryl Phosphates | Cumylphenyl Benzoate |
| | Alkyl Phosphonates | Biscumylphenyl Isophthalate |
| | Pinene | Dicyclohexyl Phthalate |
| | Cresol | Glycerol |
| | | Resorcinol Diphosphate |
| | | Tri(dichloropropyl) Phosphate |
| | | Tri-chloropropyl phosphate |
| | | BHT (di-t-butyl-p-cresol) |
| | | Caryophyllene |
| | | Camphene |

I claim:

1. A method for forming a tacky surface area on a styrenic resin comprising applying to the area a thin film of a compound having a flash point greater than about 35° C. and a boiling point between about 150° C. and about 260° C. selected from the group consisting of methyl ethers of monocyclic aromatic compounds, and a terpenoid.

2. The method of claim 1 wherein the terpenoid is dipentene.

3. The method of claim 1 wherein the monocyclic aromatic compound is anisole.

4. The method of claim 1 wherein the monocyclic aromatic compound is anethole.

5. The method of claim 1 wherein the terpenoid is citronellal.

6. The method of claim 1 wherein the terpenoid is ocimene.

7. The method of claim 1 wherein the terpenoid is phellandrene.

8. A method for applying a polystyrene coating to a container comprising the steps of first, applying to an area of said container a thin film of a compound, the compound having a flash point greater than about 35° C. and a boiling point between about 150° C. and about 260° C., the compound selected from the group consisting of methyl ethers of monocyclic aromatics and a terpenoid, and second, applying said polystyrene coating to said area.

9. The method of claim 8 wherein the terpenoid is dipentene.

10. The method of claim 8 wherein the monocyclic aromatic compound is anisole.

11. The method of claim 8 wherein the monocyclic aromatic compound is anethole.

12. The method of claim 8 wherein the terpenoid is citronellal.

13. The method of claim 8 wherein the terpenoid is ocimene.

14. The method of claim 8 wherein the terpenoid is phellandrene.

* * * * *